(12) United States Patent
Pattakos et al.

(10) Patent No.: US 9,175,731 B2  
(45) Date of Patent: Nov. 3, 2015

(54) CONSTANT VELOCITY JOINT

(71) Applicants: Manousos Pattakos, Nikea Piraeus (GR); John Pattakos, Nikea Piraeus (GR); Emmanouel Pattakos, Nikea Piraeus (GR)

(72) Inventors: Manousos Pattakos, Nikea Piraeus (GR); John Pattakos, Nikea Piraeus (GR); Emmanouel Pattakos, Nikea Piraeus (GR)

( * ) Notice: Subject to any disclaimer, the term of this patent is extended or adjusted under 35 U.S.C. 154(b) by 0 days.

(21) Appl. No.: 14/221,283

(22) Filed: Mar. 21, 2014

(65) Prior Publication Data

US 2014/0206461 A1   Jul. 24, 2014

Related U.S. Application Data

(63) Continuation-in-part of application No. 13/745,873, filed on Jan. 21, 2013, now Pat. No. 8,747,236.

(30) Foreign Application Priority Data

Feb. 2, 2012 (GB) .................................. 1201800.8  
Feb. 13, 2012 (GB) .................................. 1202380.0

(51) Int. Cl.  
*F16D 3/30* (2006.01)  
*F16D 3/16* (2006.01)

(52) U.S. Cl.  
CPC ... *F16D 3/30* (2013.01); *F16D 3/16* (2013.01)

(58) Field of Classification Search  
CPC ..................................... F16D 3/16; F16D 3/30  
USPC .......... 464/106, 112, 126, 134, 135, 904, 905  
See application file for complete search history.

(56) References Cited

U.S. PATENT DOCUMENTS 5,186,686 A * 2/1993 Staples et al. ................. 464/904

* cited by examiner

*Primary Examiner* — Gregory Binda

(57) ABSTRACT

A constant velocity joint comprising a first shaft rotating about a first rotation axis, a second shaft rotating about a second rotation axis, with the first and the second rotation axes intersecting at the center of the joint, three triads of yokes, each triad of yokes comprising a control yoke, a first shaft yoke pivotally mounted on the first shaft and a second yoke pivotally mounted on the second shaft, with the three yokes of the triad of yokes pivotally mounted to each other to pivot about a common axis passing from the center of the joint, the three control yokes, one from each triad of yokes, are pivotally mounted to each other to pivot about a common axis passing from the center of the joint, with the transmission ratio of the constant velocity joint remaining strictly at 1:1 no matter what the angle between the two rotation axes is.

7 Claims, 20 Drawing Sheets

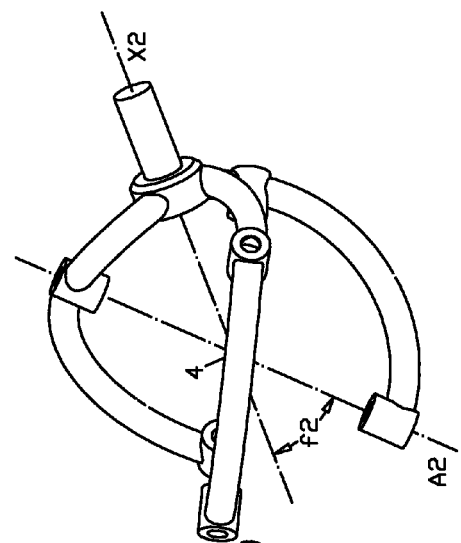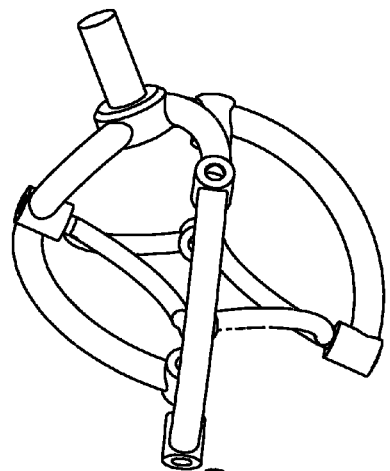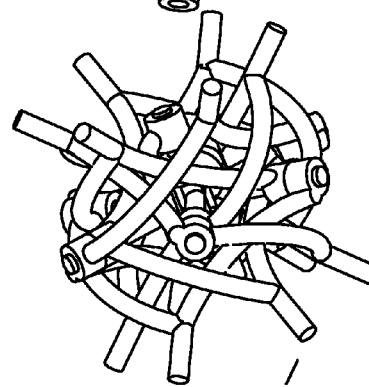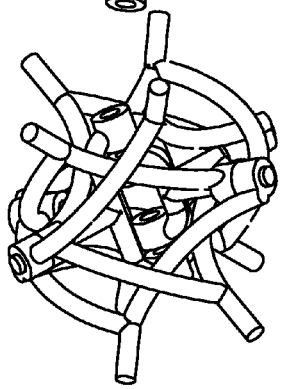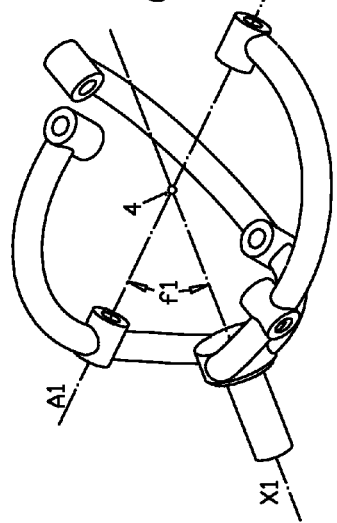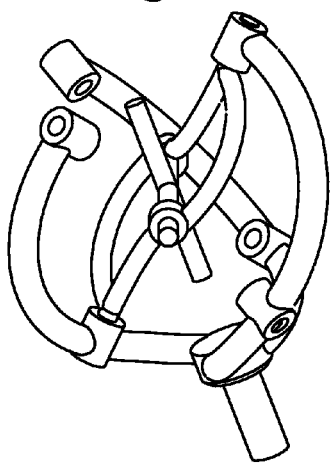
Fig 8    Fig 9

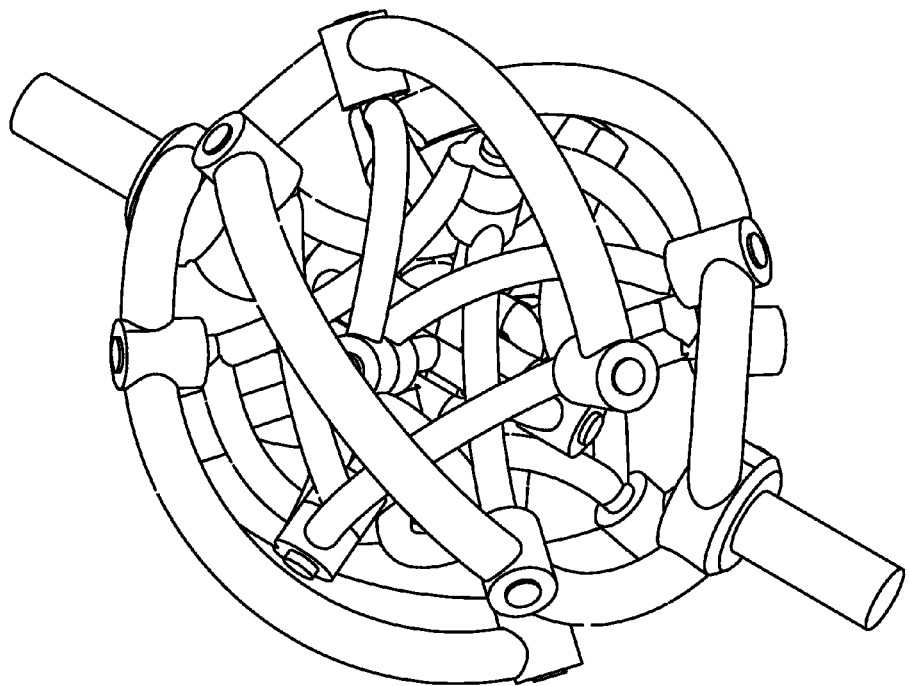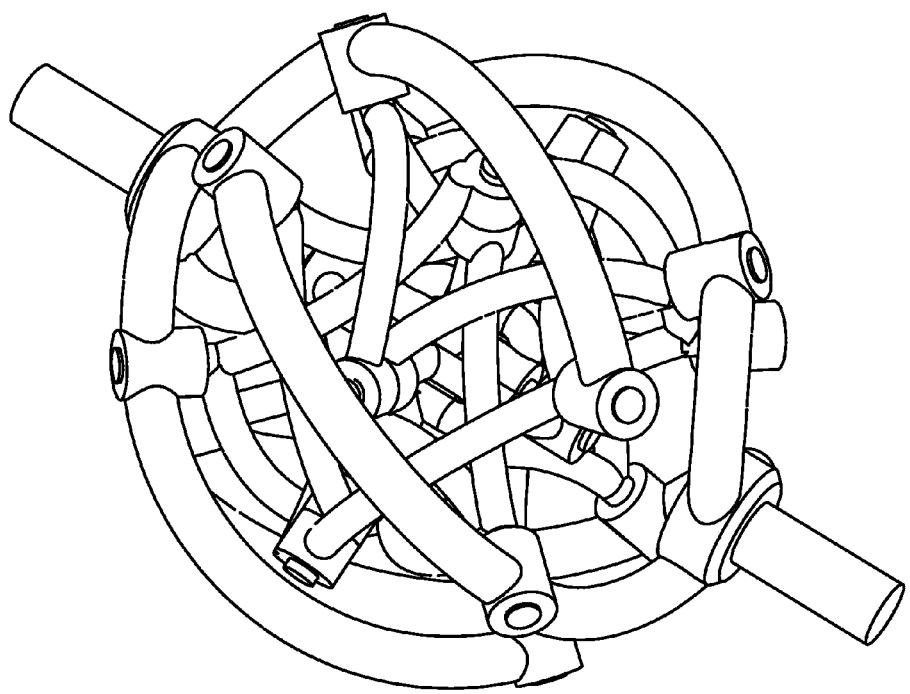
Fig 11

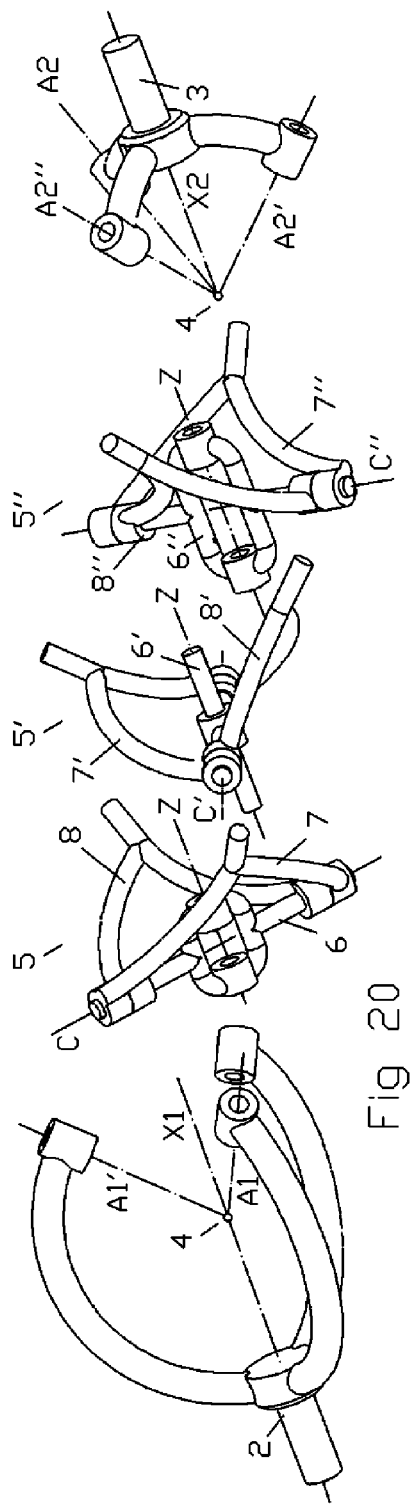
Fig 20
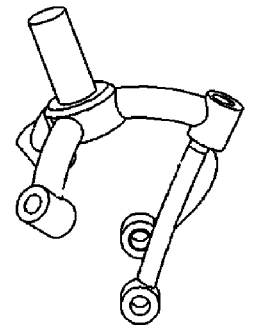
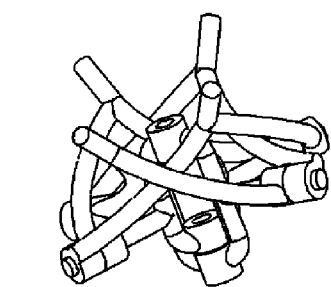
Fig 21

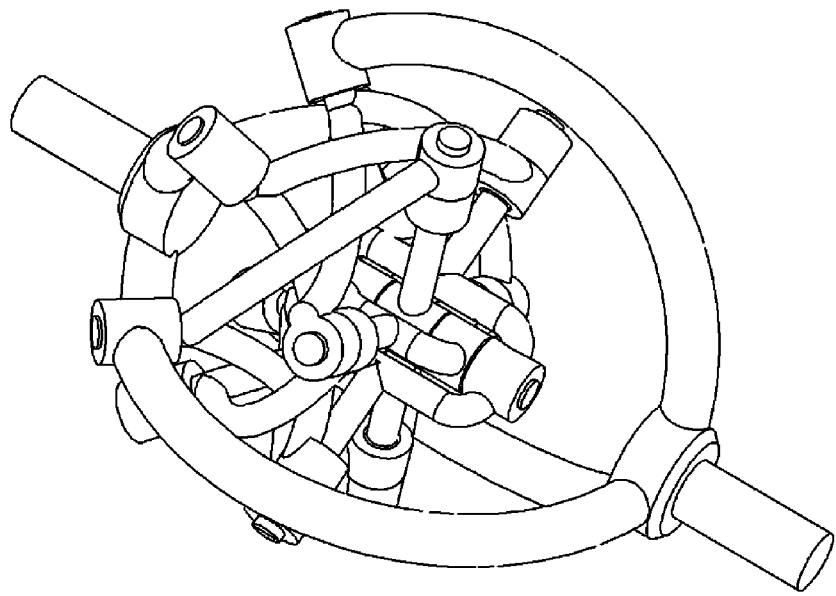
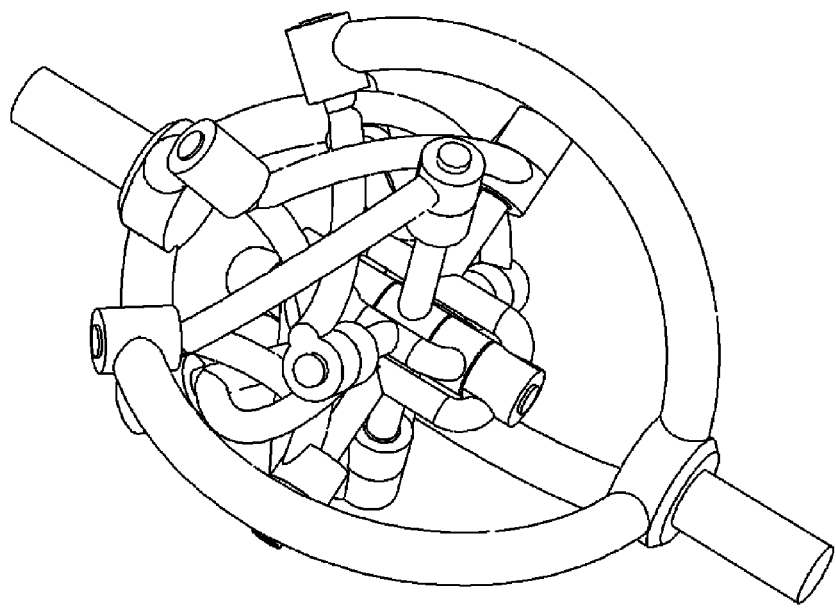
Fig 23

CONSTANT VELOCITY JOINT

This application is a continuation-in-part of U.S. patent application Ser. No. 13/745,873, filed Jan. 21, 2013, now U.S. Pat. No. 8,747,236, the entire disclosure of which is incorporated herein by reference, which in turn claims priority to GB1201800.8 filed Feb. 2, 2012 and to GB1202380.0 filed Feb. 13, 2012.

BACKGROUND ART

The closest prior art is the U.S. Pat. No. 7,442,126, FIGS. 1, 2, 4, wherein, according the FIG. 2 of the present invention, a first shaft yoke 7 a second shaft yoke 8 and a control yoke 6 are pivotally mounted to each other to pivot about a common axis. The first shaft yoke 7 is pivotally mounted on a first shaft 2' with the pivot axis perpendicular to the first shaft rotation axis, the second shaft yoke 8 is pivotally mounted on "a second shaft boss 3' having an axis normal to said second shaft rotation axis", as disclosed in the first claim of the closest prior art patent.

The control yoke 6 is pivotally mounted to the center of a spherical pantograph, or control, mechanism 9 to keep the common axis at the right orientation and the transmission ratio at 1:1. The one end 10 of the control mechanism 9 pivots about an oblique pin 11 of the first shaft 2', the other end 12 of the control mechanism 9 pivots about an oblique pin 13 of the second shaft 3'.

The spherical pantograph mechanism 9 comprises six articulated "links" (they actually act as six articulated yokes), with all pivot axes intersecting at the center of the joint.

In total the closest prior art CVJ, or TCVJ (Thompson Constant Velocity Joint) comprises nine yokes of all kinds: a triad 5 that makes the main work and comprises a first shaft yoke 7, a second shaft yoke 8 and a control yoke 6, and six more links that constitute the control mechanism 9 that keeps the common axis at the right orientation.

Besides transferring torque from the one shaft to the other, the mechanism is capable for transferring axial load without needing thrust bearings, at least in the case the two shafts are in a straight line. When the two shafts are at an angle, thrust loads on the joint bearings result, just like in the conventional Cardan joint. The thrust loads are proportional to the axial load transferred by the joint and depend on the angle between the shafts and on the rotation angle of the shafts.

A disadvantage of the closest prior art (or TCVJ) coupling is that it cannot reliably operate with the two shafts at a straight line. A minimum angle of 2 degrees between the two shafts is required, otherwise "the parts of the coupling rapidly wear" according the inventor and maker of the TCVJ (quote from his web site, under the title Special Instructions: "Continuous operation of the TCVJ coupling at 0 degrees is not recommended as this will cause wear on bearings and cause damage to the coupling. For maximum efficiency and life of the TCVJ coupling, a minimum operating angle of 2.0 degrees is recommended.")

With the two shafts at a straight line, the first shaft yoke 7 and the second shaft yoke 8 stay coplanar, which means their normal to the common axis pivots are in a straight line perpendicular to both, the common axis and the straight line along the two shafts. The support of the control yoke 6 becomes problematic and the result is the rapid wear of the bearings.

With the two shafts at an angle, the TCVJ transmits the torque of the driving shaft to the driven shaft and loads the control yoke 6 with a respective idle torque. In order the control mechanism 9 to support the control yoke 6 and to receive the idle torque, it bends slightly at one direction. After the shaft angle wherein the two shaft yokes become coplanar, the idle torque changes direction and the control mechanism 9 bends at the opposite direction. That is, in order to provide to the control yoke 6 the necessary support, the control mechanism 9 bends at one direction leaving its geometrically correct position, and when the necessary support changes direction, the control mechanism 9 bends at the opposite direction, leaving again its geometrically correct position.

Geometrically the TCVJ coupling is perfect, but the flexibility of the parts and the inevitable lash of the bearings spoil the geometry.

For instance, with just 0.02 mm lash in every bearing of the spherical pantograph of the TCVJ, and with the shafts of the coupling at one degree angle, the spherical pantograph 9 performs an oscillating motion bending, like a chord, initially at one direction until it is adequately bend away to provide the necessary support/force to the control yoke 6, then it bends at the opposite direction until it is adequately bend away to provide the necessary force to the control yoke 6 at the other direction, and so on.

The impact loads of this motion combined with the absence of rotation of the pin of the bearing relative to the rest bearing (because of the small angle between the shafts) spoils the lubrication of the bearing and causes the fatigue of the bearings.

Another disadvantage of the TCVJ is the moment of inertia of the control yoke that loads the driving and the driven system with an inertia torque and torsional vibrations. With the two shafts rotating at constant angular velocity, the control yoke rotates at a varying angular velocity. The bigger the angle between the shafts, the wider the variation of the angular velocity of the control yoke. The control yoke accelerates, absorbing energy from the shafts, and then decelerates, delivering energy to the shafts, two times per shaft rotation.

It is an object of the present invention to address the above disadvantages. Accordingly, there is provided a constant velocity joint as defined in the appended claims.

BRIEF DESCRIPTION OF THE DRAWINGS

FIG. 8 shows what FIG. 7, with the two shafts of the mechanism moved at left and right.

FIG. 9 shows what FIG. 8 with a pair of shaft yokes and the respective control yoke assembled onto the two shafts.

FIG. 11 shows the mechanism of FIG. 7 from two different viewpoints. The simultaneous watching of the two images makes the details clear.

FIG. 20 shows the fourth embodiment partly disassembled.

FIG. 21 shows the fourth embodiment partly disassembled; a pair of shaft yokes and the respective control yoke are shown assembled onto the two shafts.

FIG. 23 shows the mechanism of FIG. 19 from two different viewpoints. The simultaneous watching of the two images makes the details clear.

SUMMARY OF THE INVENTION

Among the objects of this invention is to disclose a CVJ that:

interconnects two shafts with a strict 1:1 transmission ratio for a wide range of angles between the two shafts, is capable to transmit heavy axial loads, is reliable throughout the complete range of angles between the shafts, the case with the two shafts at a straight line included, splits the torque among all the peripheral bearings, avoids the weak control mechanism of the prior art, substantially decreases the inertia vibrations, is capable for a wide range of shaft angles, even wider than −50 to +50 degrees.

PREFERRED EMBODIMENTS

Figure 1:
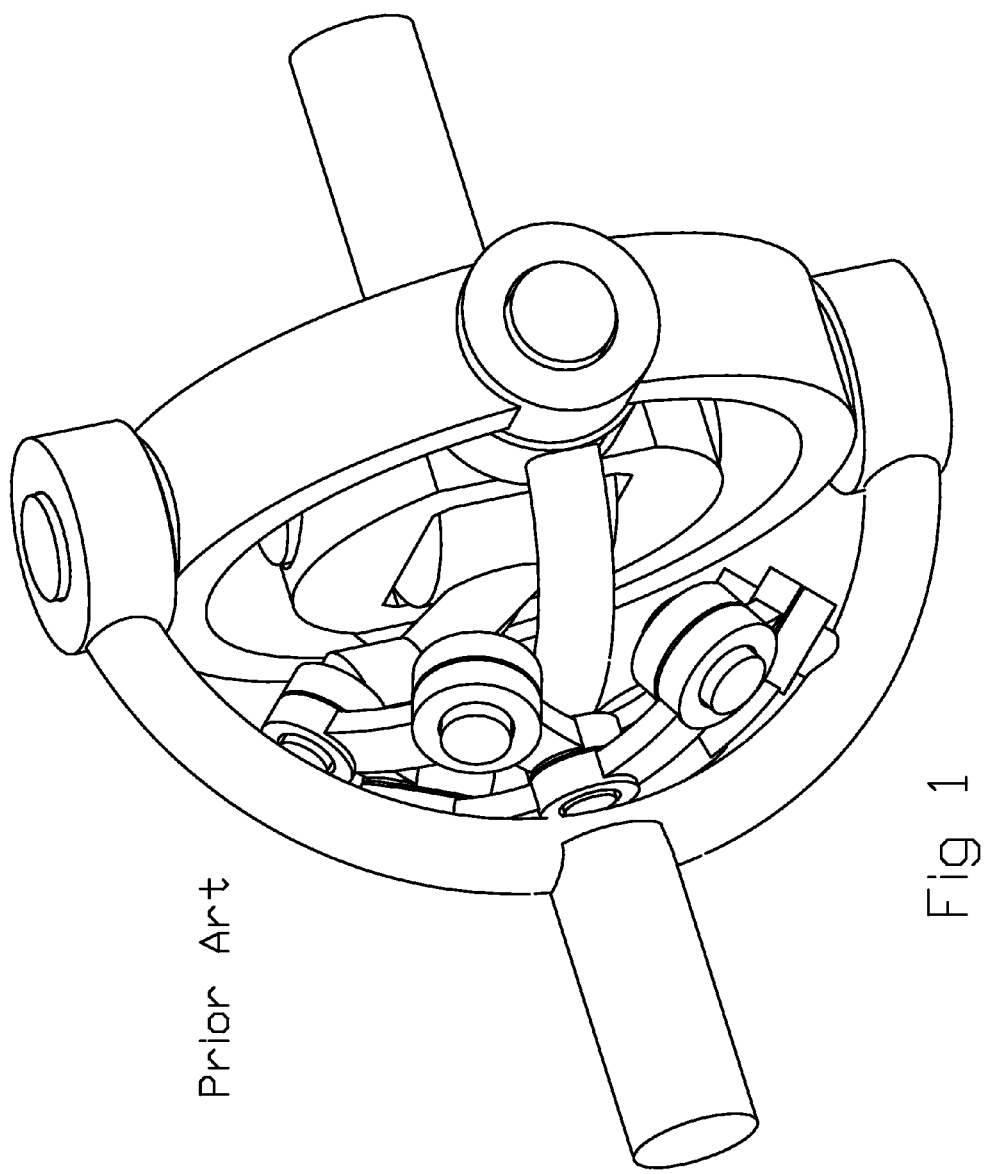
FIG. 1 shows the state of the art CVJ, or TCVJ.
Figure 2:
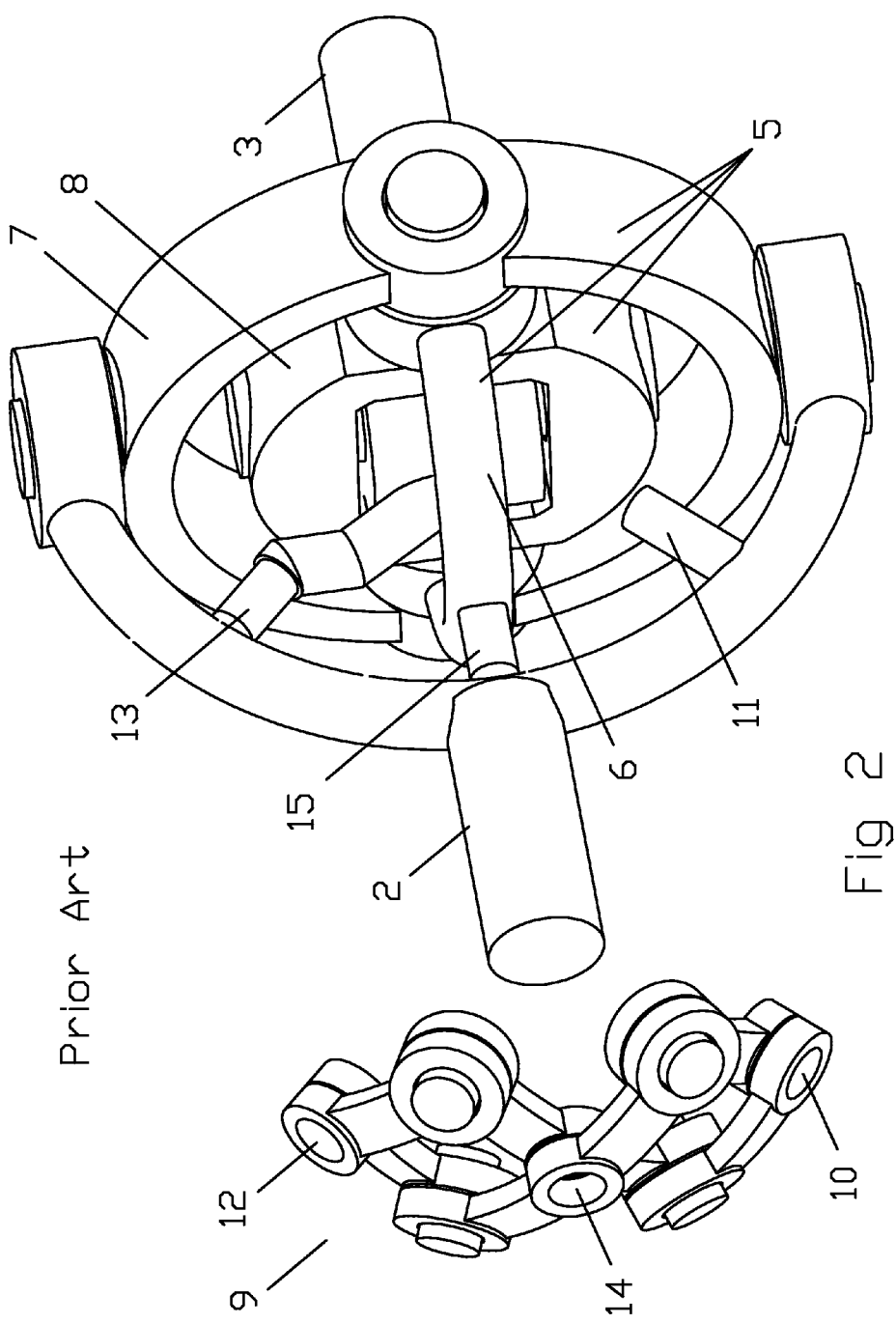
FIG. 2 shows what FIG. 1 after the removal of the control mechanism, which is shown at left.
Figure 3:
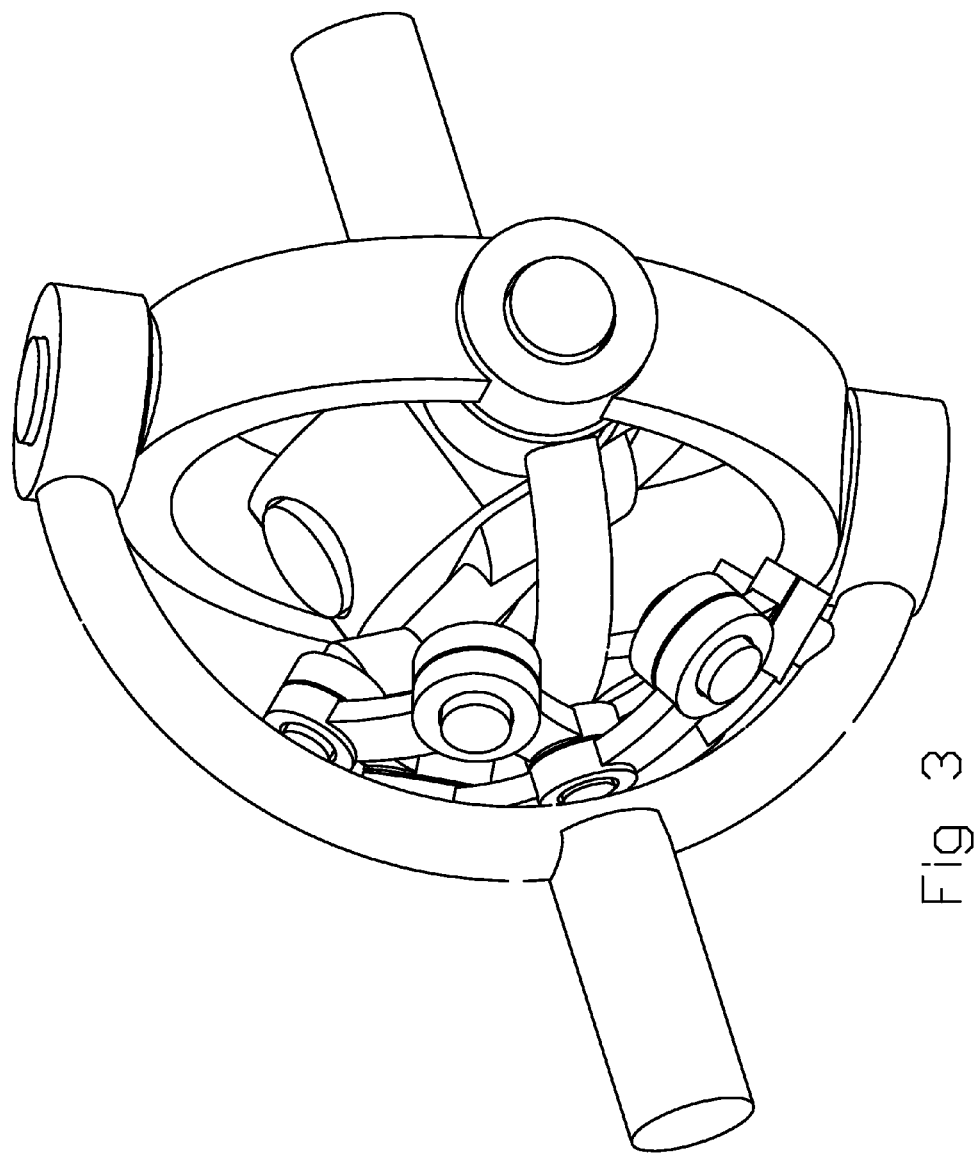
FIG. 3 shows a first embodiment.
Figure 4:
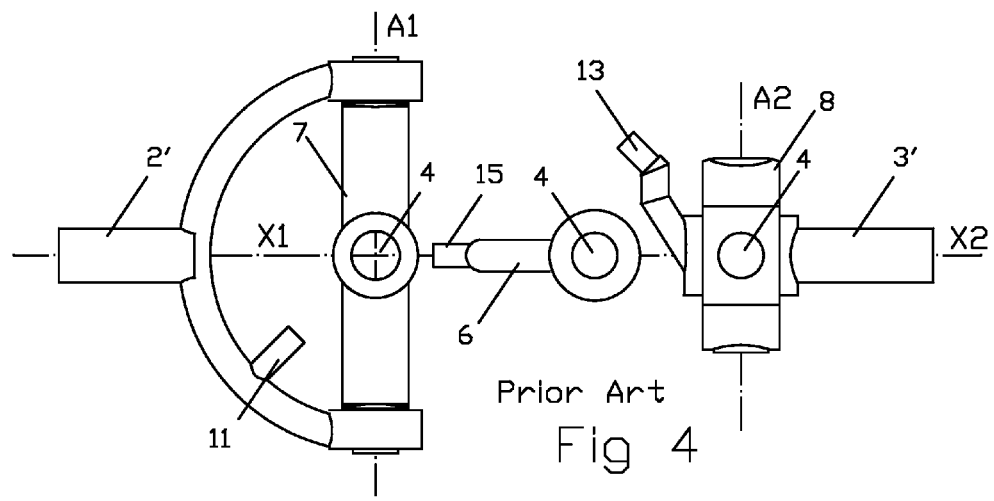
FIG. 4 shows the main mechanism of the prior art partly disassembled.
Figure 5:
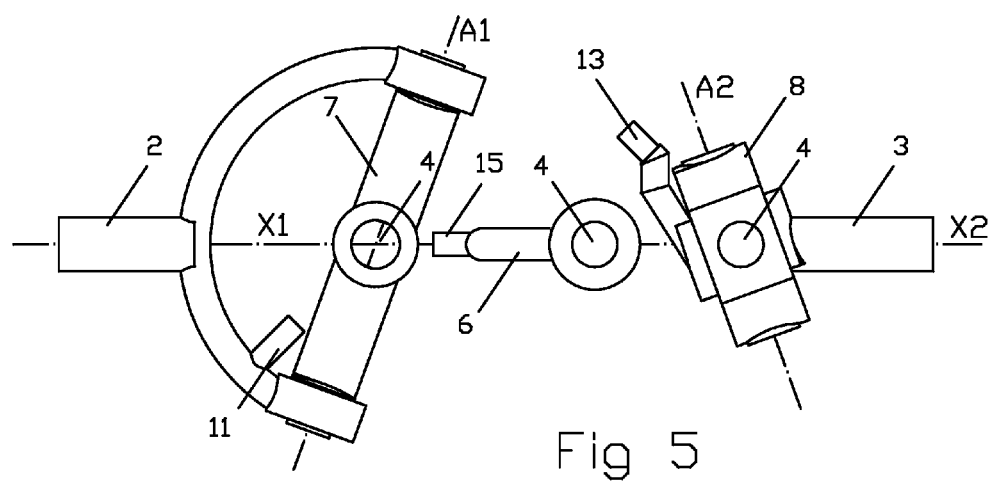
FIG. 5 shows the main mechanism of the first embodiment partly disassembled for comparison to the state of the art of FIG. 4.
Figure 6:
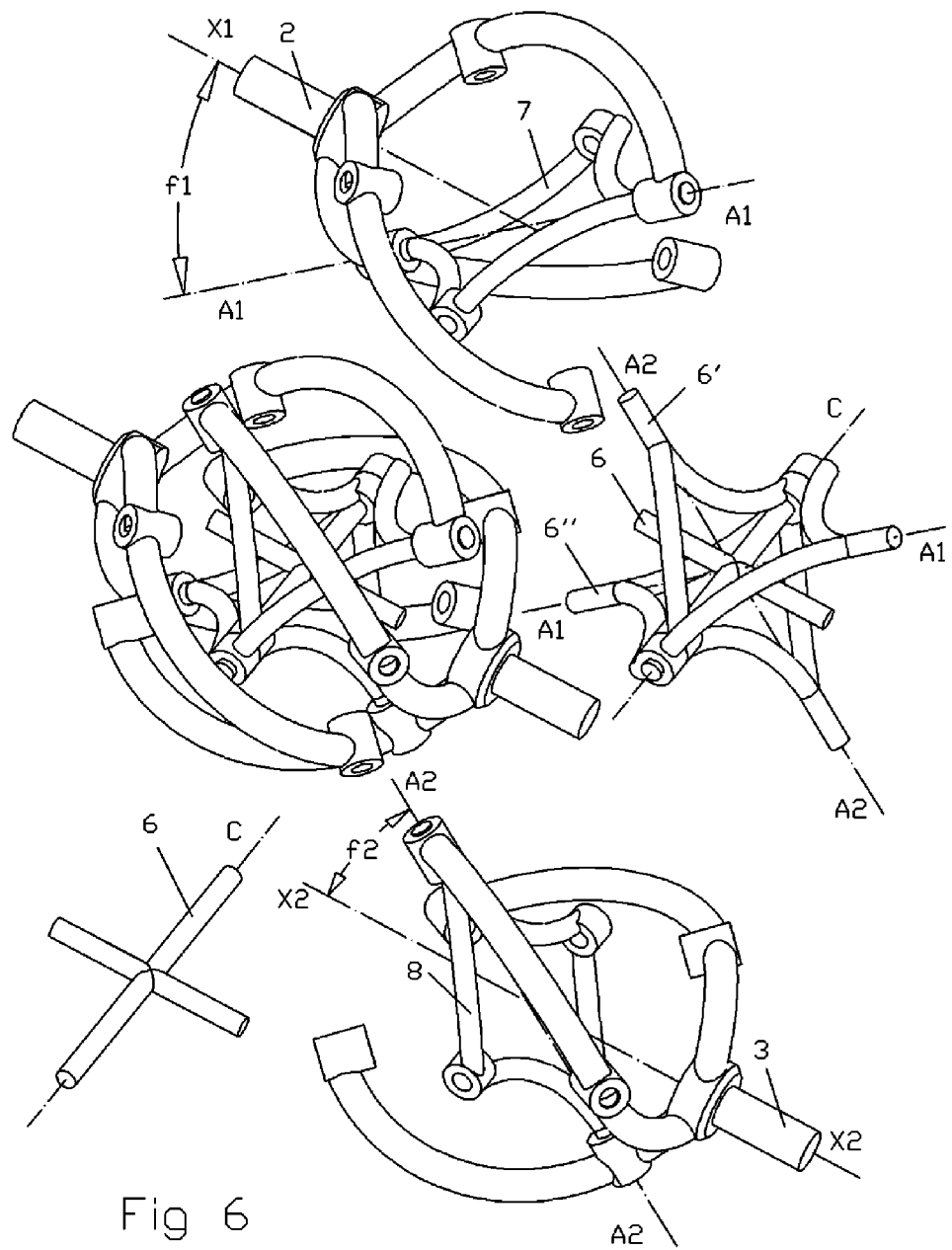
FIG. 6 shows some parts and subassemblies of a second embodiment.
Figure 7:
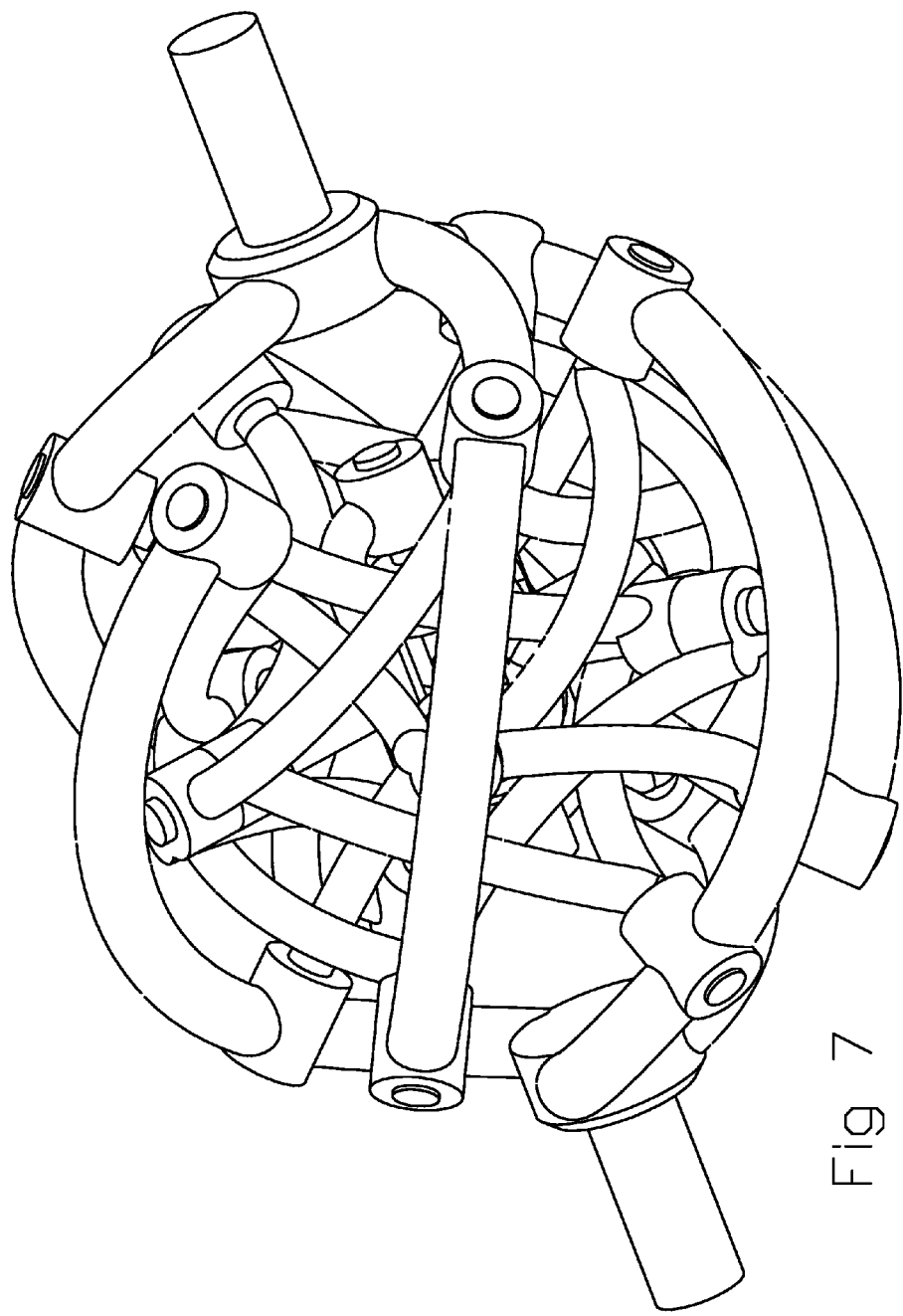
FIG. 7 shows the second embodiment complete.
Figure 10:
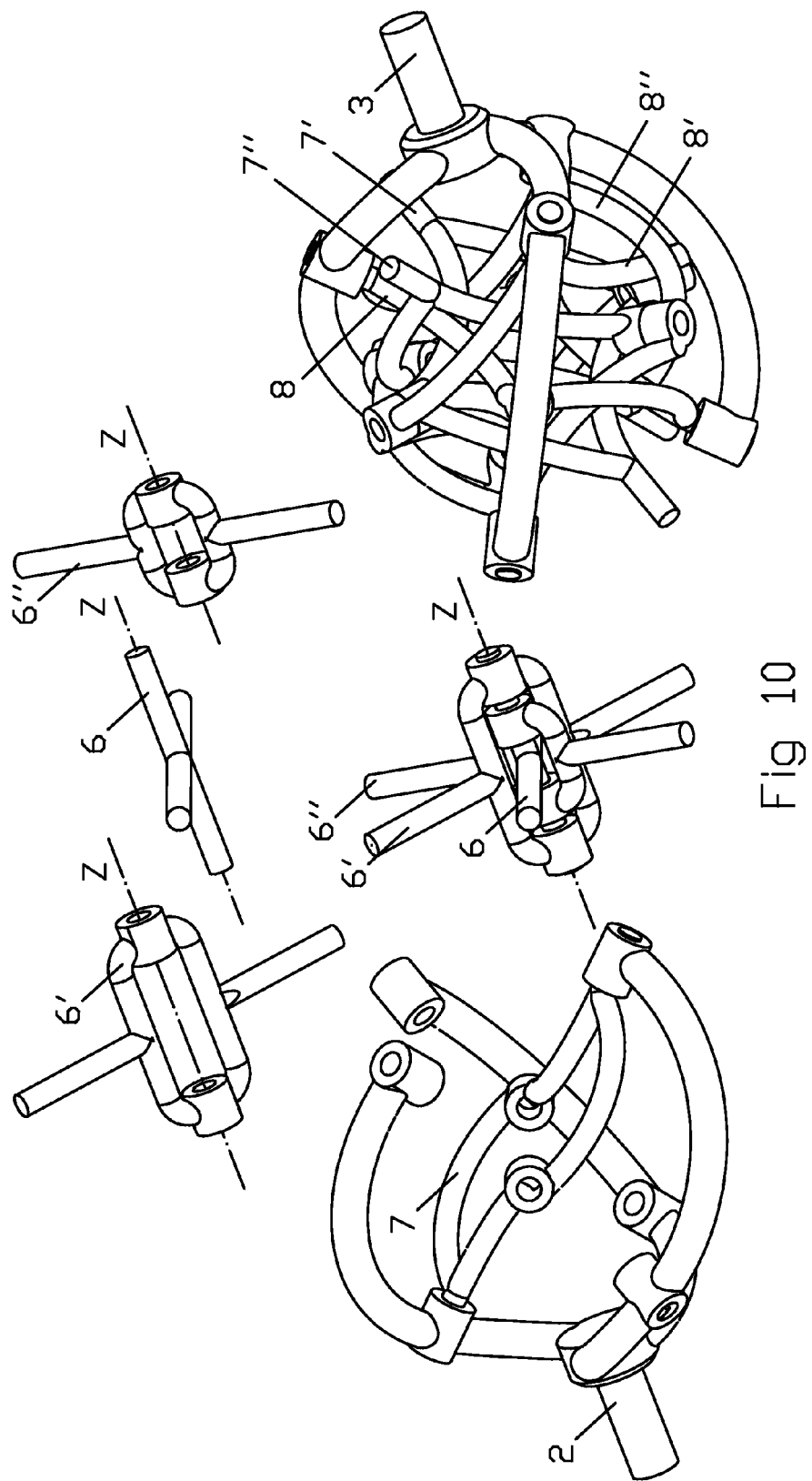
FIG. 10 shows what FIG. 7 partly disassembled. In the middle it is shown the assembly of the three control yokes, which is also shown at top disassembled.
Figure 12:
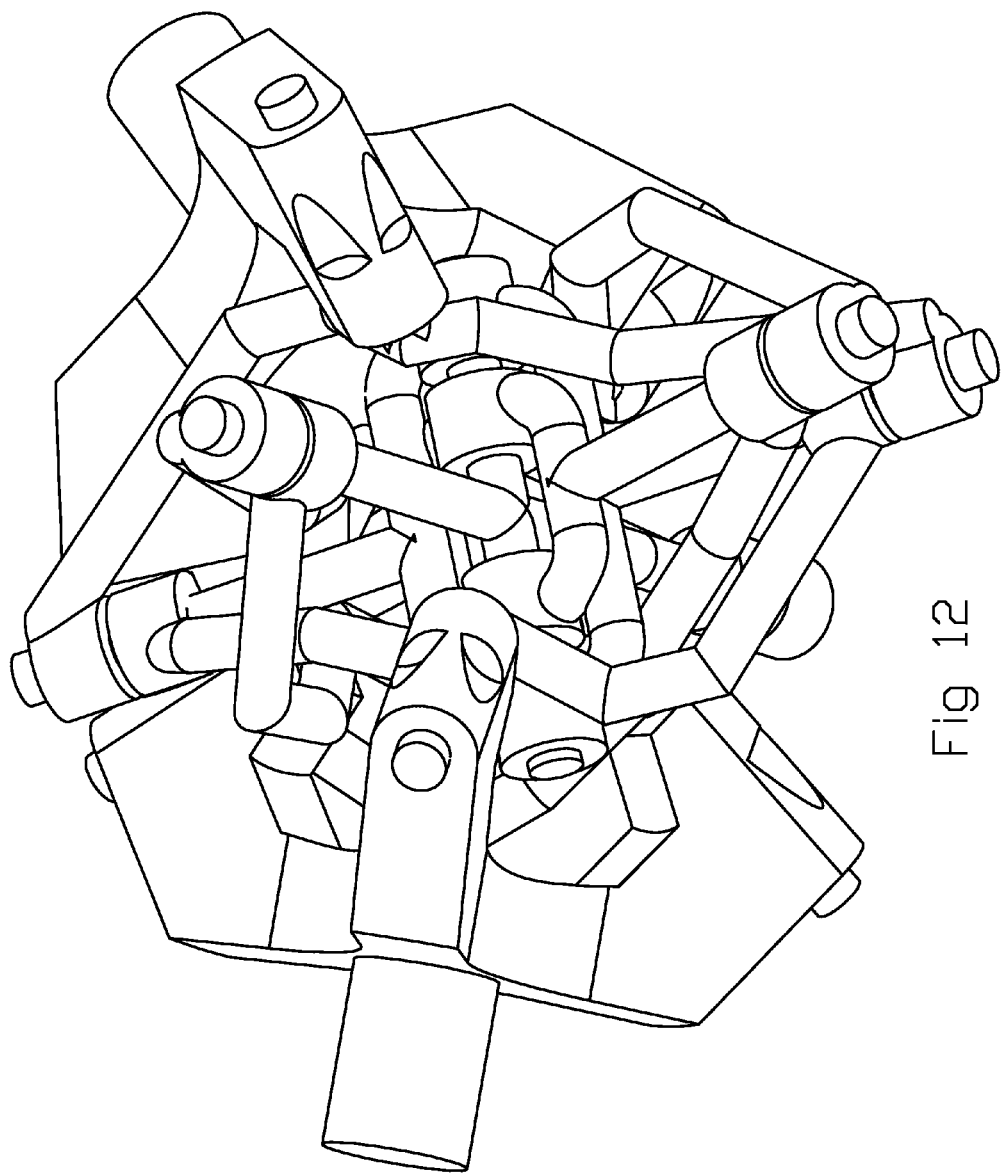
FIG. 12 shows a third embodiment.
Figure 13:
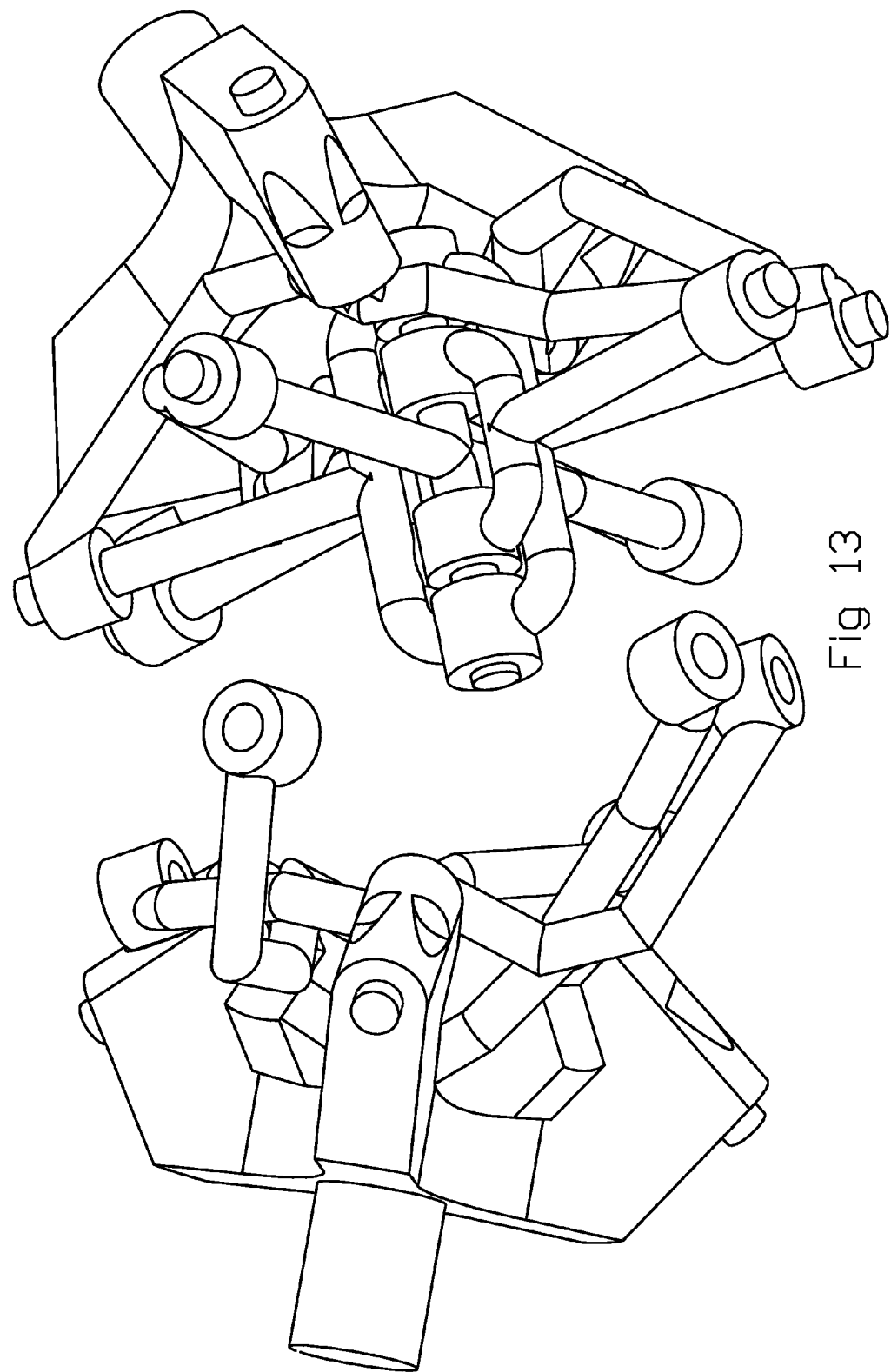
FIG. 13 shows the third embodiment partly disassembled.
Figure 14:
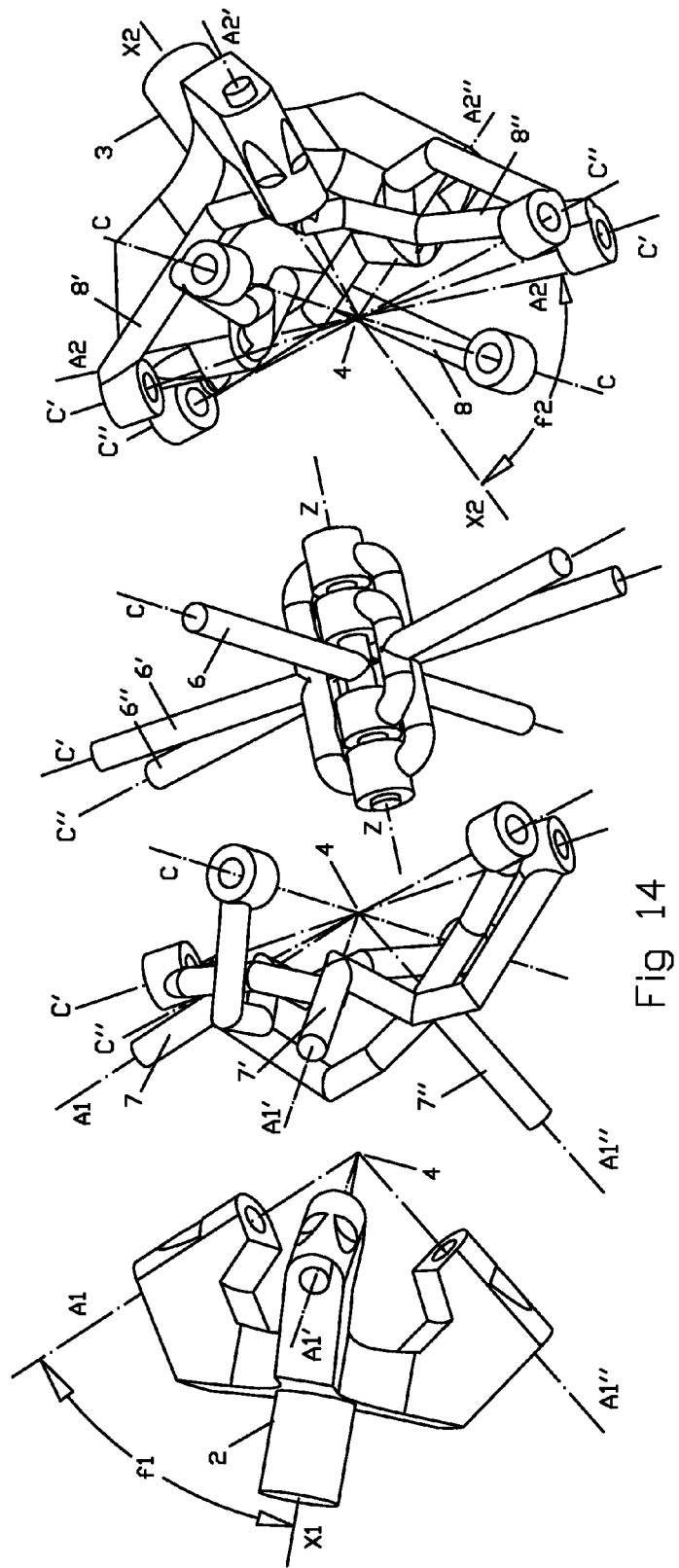
FIG. 14 shows the third embodiment partly disassembled.
Figure 15:
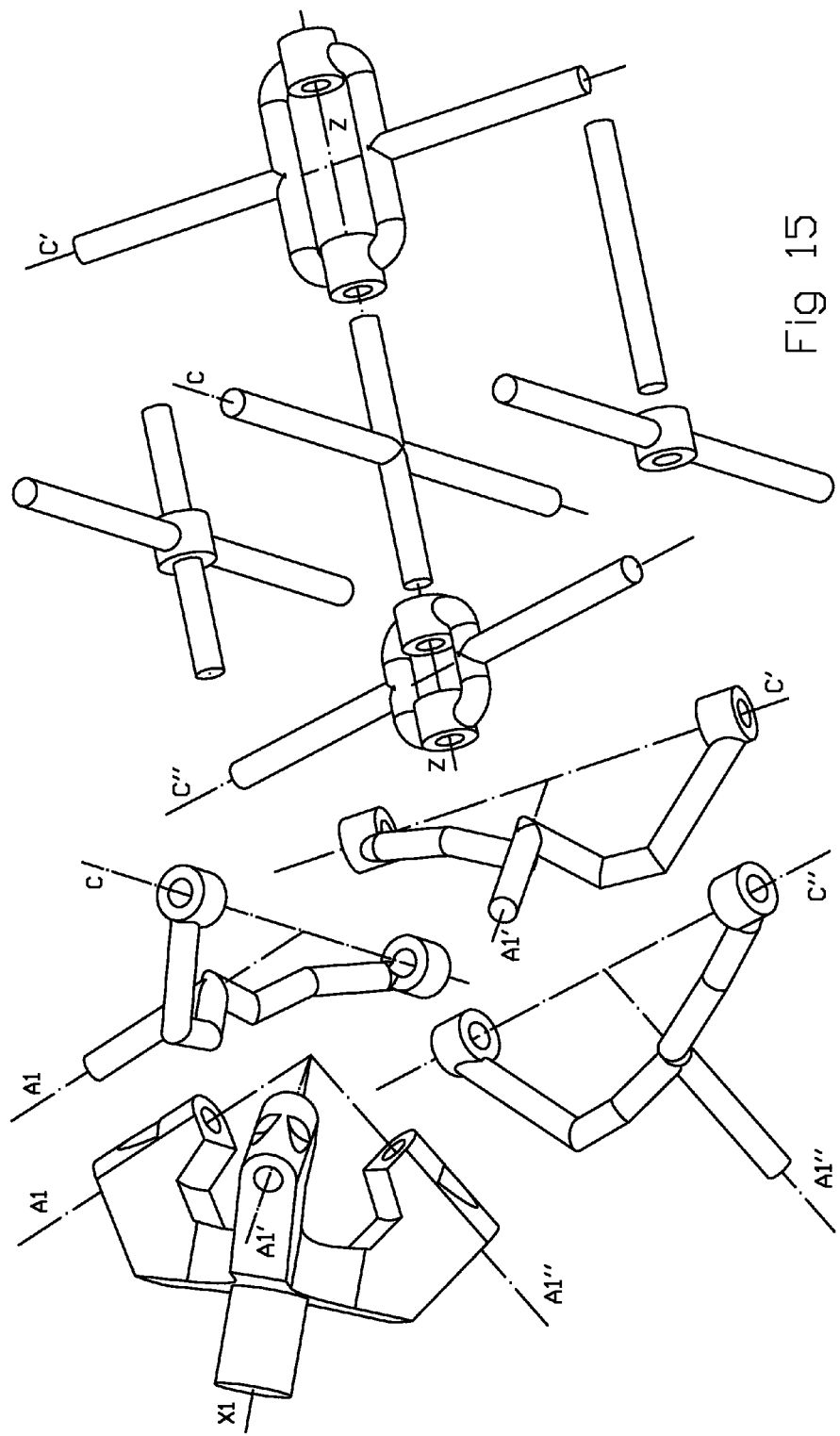
FIG. 15 shows the left shaft of the third embodiment, its three shaft yokes and the three control yokes.
Figure 16:
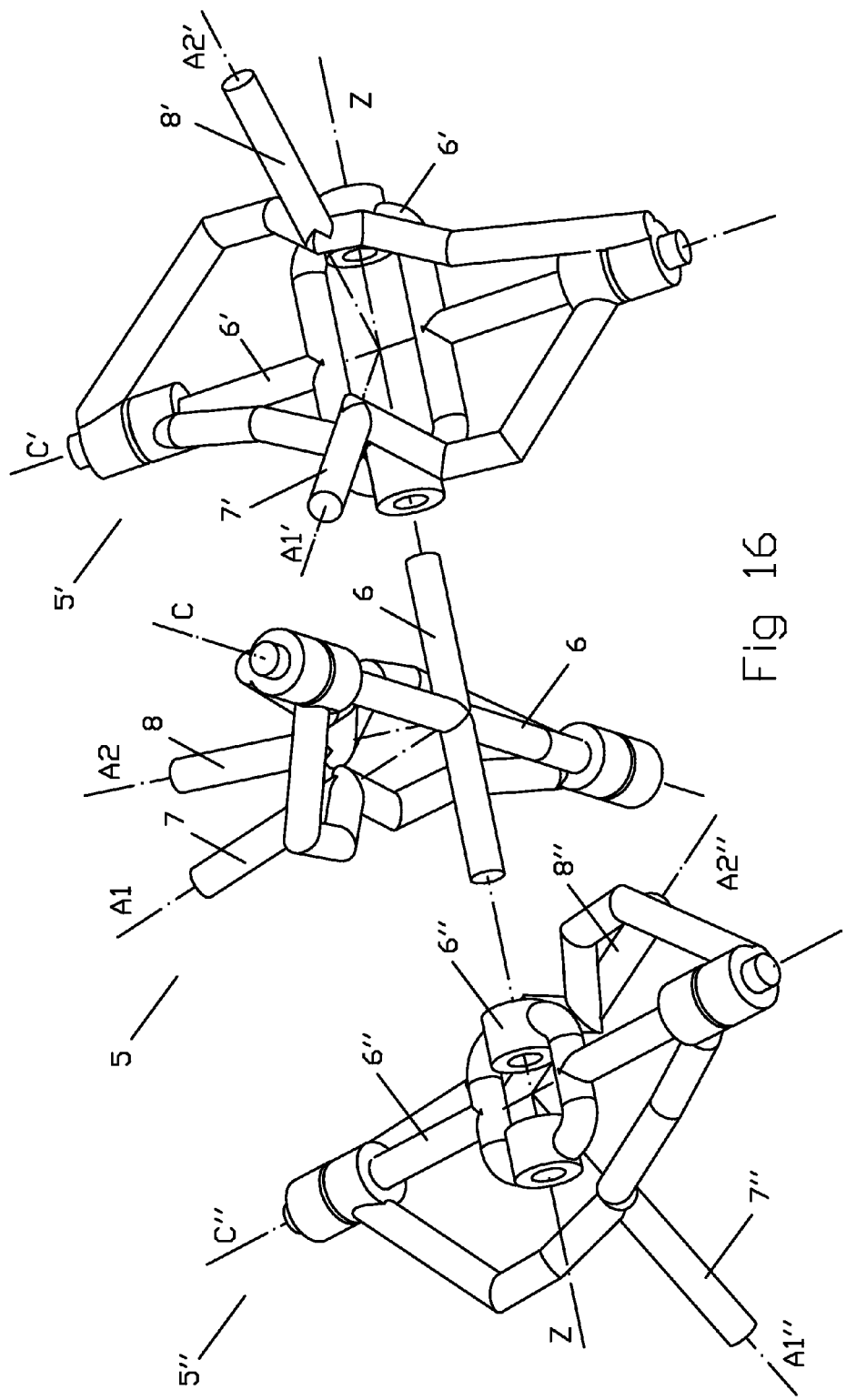
FIG. 16 shows three subassemblies of the third embodiment each comprising a control yoke and the pair of shaft yokes it connects.
Figure 17:
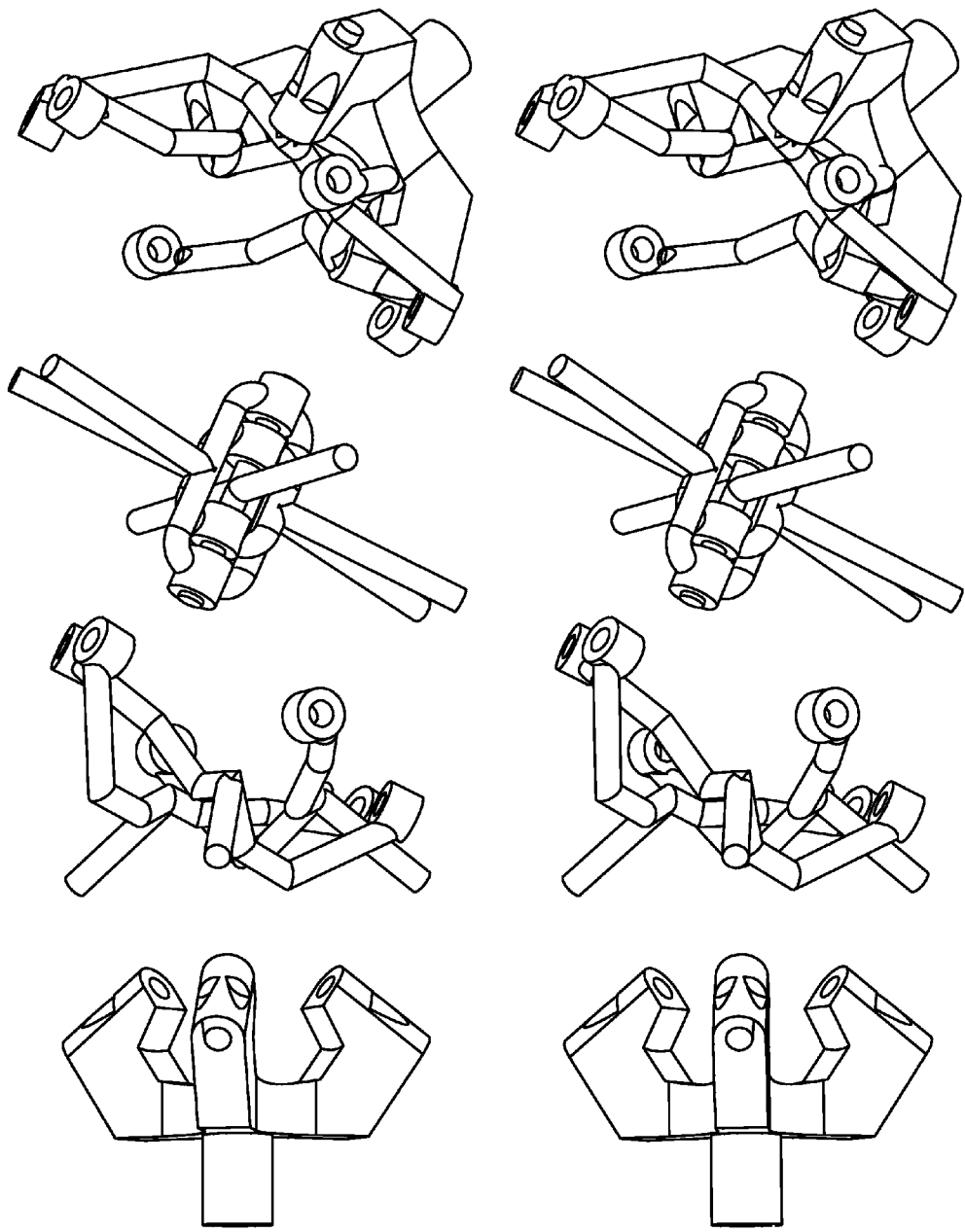
FIG. 17 shows, from two different viewpoints, the third embodiment partly disassembled. The simultaneous watching of the left and right images makes the details clear.

In a first embodiment, FIGS. 3 and 5, the CVJ resembles to that of the closest prior art.

Two shaft yokes and a control yoke are pivotally mounted to each other so that they pivot about a common axis. The first shaft yoke 7 is pivotally mounted on the first shaft 2 with the first shaft pivot axis A1 substantially oblique relative to the rotation axis X1 of the first shaft 2. The second shaft yoke 8 is pivotally mounted on an oblique boss of a second shaft 3, with the second shaft pivot axis A2 substantially oblique relative to the rotation axis X2 of the second shaft 3. The A1 and the A2 axes remain symmetrical about the bisecting plane of the angle between the rotation axes X1 and X2 of the two shafts by means of the control yoke 6 which is pivotally mounted on the center 14 of a spherical pantograph, or control, mechanism 9. The one end 10 of the control mechanism 9 pivots on an oblique pin 11 of the first shaft 2, the other end 12 of the control mechanism 9 pivots on an oblique pin 13 of the second shaft 3.

The shaft yokes 7 and 8 remain permanently not coplanar, which means the A1 and the A2 axes remain not collinear, avoiding the unstable/unreliable condition of the closest prior art. For as long as the torque transferred remains exclusively positive (or exclusively negative), the control mechanism 9 is permanently loaded at the same direction so that it bends slightly at one direction only and needs not to pass from its "unstable condition" twice per shaft rotation. This way the CVJ operates reliably and efficiently even when the two shafts 2 and 3 are near, or exactly, a straight line.

Just like the TCVJ, the CVJ of the first embodiment consists of a main mechanism 5 (the two shaft yokes 7 and 8 and the control yoke 6) to withstand the loads, and of a secondary mechanism 9 for the control.

In comparison to the TCVJ, the maximum idle torque that loads the control mechanism of the CVJ of the first embodiment is heavier, decreasing the capacity of the joint for a given control mechanism. Besides, in case of axial load, stronger thrust loads are generated.

The next embodiments solve these disadvantages.

In a second embodiment, FIGS. 6 to 11, the CVJ comprises three mechanisms like the main mechanism 5 of the first embodiment (the boss of the second shaft is replaced by a fork like that of the first shaft), and without secondary mechanism at all. The number of yokes of all kinds remains 9 as in the closest prior art. The three mechanisms are arranged at 120 degrees from each other. The three control yokes 6, 6' and 6", which are actually control crosses, are pivotally mounted to each other to pivot about a common axis Z. Instead of "dedicating" some parts to the control of the mechanism, and some others to the transfer of the torque and of the axial load, now all parts contribute to both, the control of the mechanism and the transfer of the torque and axial loads.

In a third embodiment, FIGS. 12 to 17, the shaft yokes of the second embodiment are forks. The forks 7, 7', 7", 8, 8' and 8" are mounted to the shafts 2 and 3 by double, or longer, bearings. This arrangement enables wider angles between the two shafts, making the joint appropriate for even wider angles between the shafts. For the assembly of the mechanism, one of the control yokes comprises two pieces secured to each other to form a cross; with the one piece being a pin that inserts into a hole of the other piece. Above and below the single piece cross of FIG. 15, it is shown the version wherein the cross comprises two pieces, the one secured to the other. The pin of the two pieces cross is assembled last, "locking" the joint.

For the minimization of the inertia torque, for simplicity, for symmetry, for the minimization of the maximum loads on the parts and for equal distribution of the loads among the peripheral bearings, the shaft yokes are spaced out at 120 degrees around their shaft axis, while they are arranged at the same angle, about 50 degrees in this specific realization, from the rotation axis of their shaft.

With conventional universal joint bearings, like those used in the TCVJ of the closest prior art, the mechanisms of the second and third embodiments can take similar axial loads with the TCVJ.

For instance: with the two shafts 2 and 3 of the CVJ of the third embodiment at a straight line, the axial load applied on the first shaft 2 passes through the three shaft yokes 7, 7' and 7" of the first shaft 2, to the assembly of the three control yokes 6, 6' and 6"; then it passes to the second shaft 3 through its three shaft yokes 8, 8' and 8". Conventional universal joint bearings keep the shaft yokes in place, so that the actual center 4 of the joint remains at the geometrical center of the joint without significant thrust loads on the bearings, just like in the TCVJ of the closest prior art.

In case of axial loading with the shafts at an angle, the universal joint bearings take the resulting thrust loads, just like the universal joint bearings of the TCVJ take the resulting thrust loads.

Instead of the single and heavy control yoke 6 of the TCVJ, the second and third embodiments of this invention include three lighter members (crosses 6, 6' and 6") arranged around the mechanism (typically at 120 degrees apart from each other when the shafts are at a straight line). The total idle energy that oscillates to-and-fro the shafts and the three control yokes, to make them move as the mechanism commands, is smaller because when some of them absorb energy to accelerate, some other return energy to decelerate making the total inertia torque on the shafts smaller (just like a six cylinder even firing engine has smaller inertia torques than a four in line even firing engine).

Figure 18:
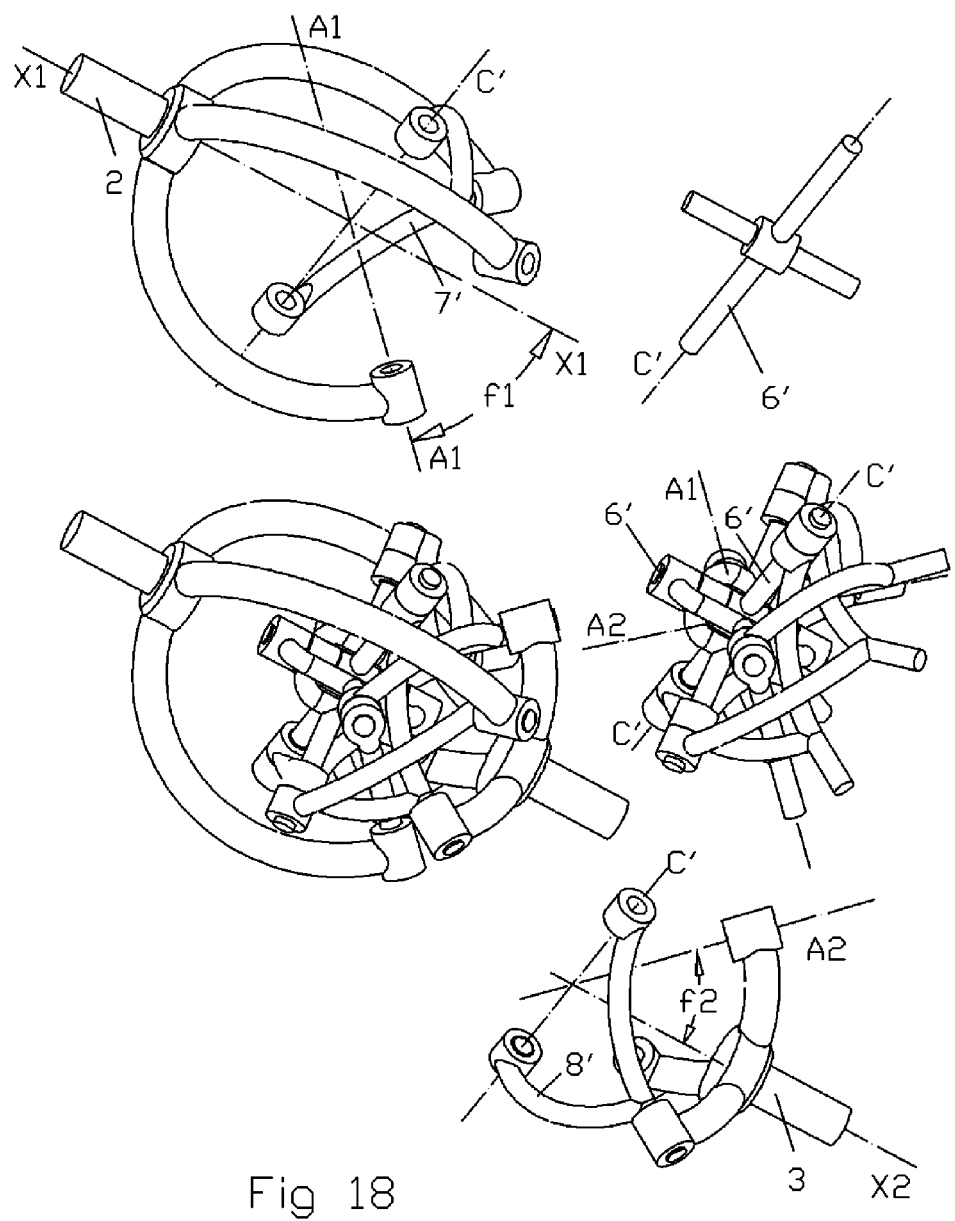
FIG. 18 shows some parts and subassemblies of a fourth embodiment.
Figure 19:
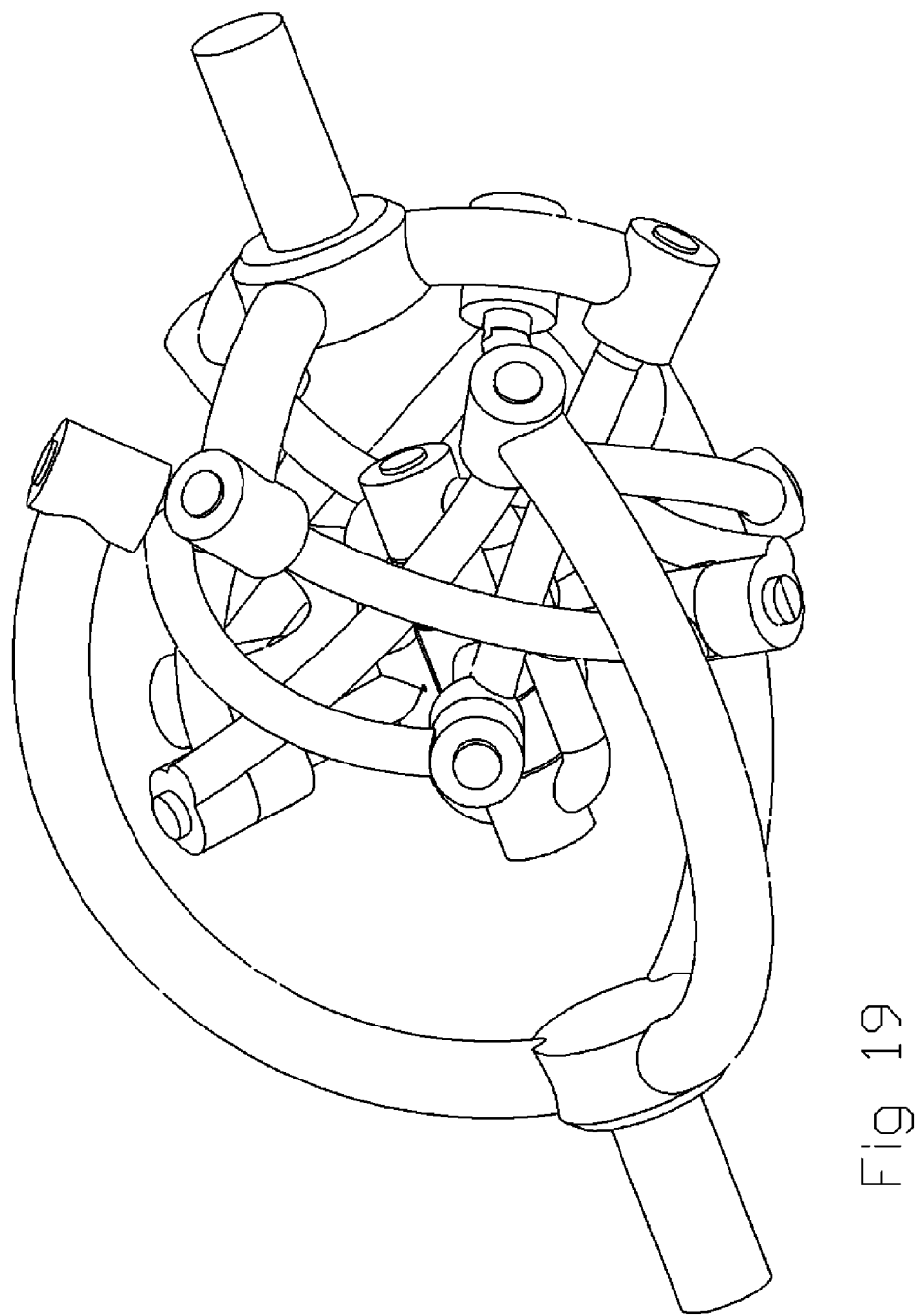
FIG. 19 shows the fourth embodiment complete.
Figure 22:
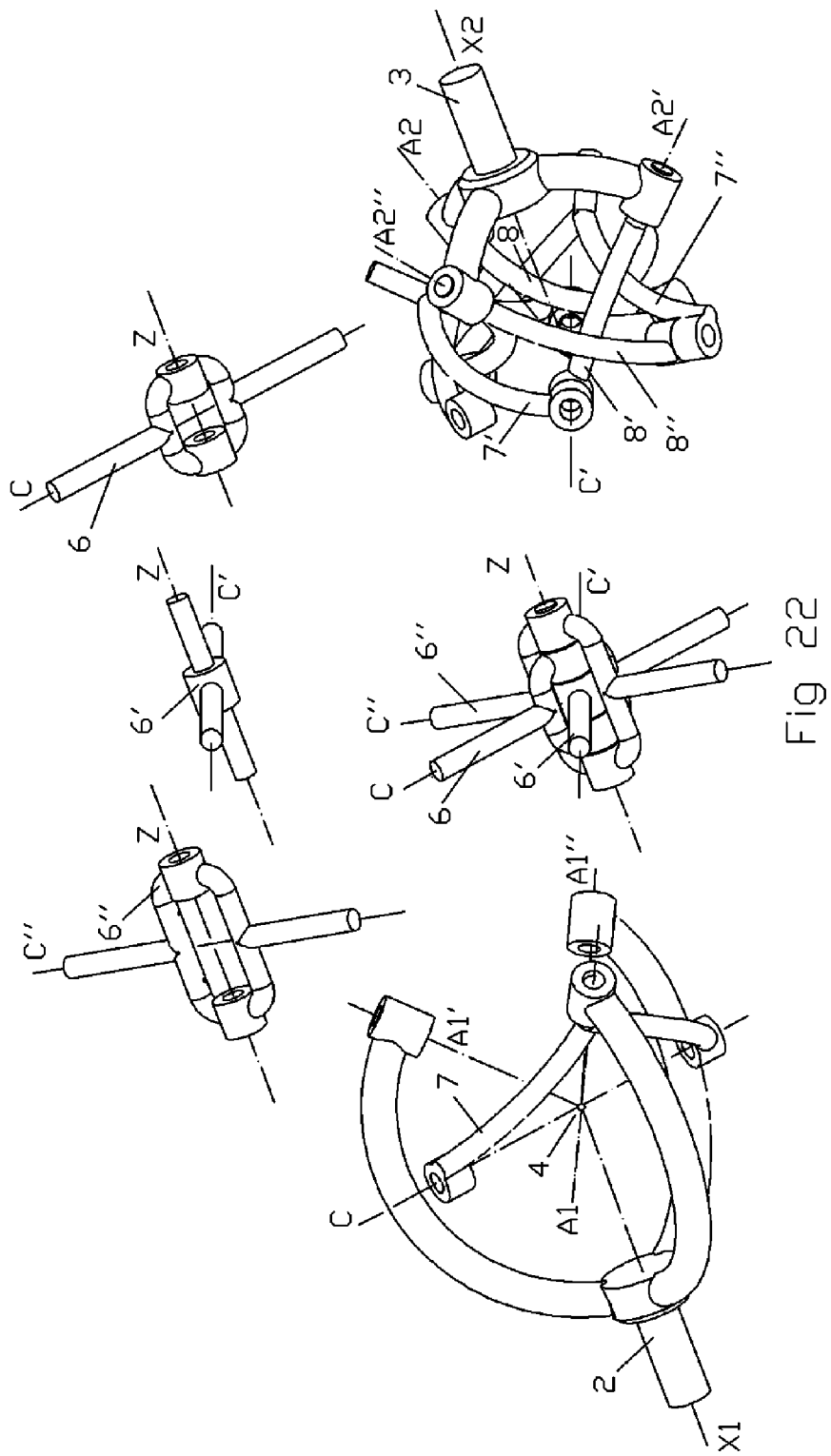
FIG. 22 shows what FIG. 19 partly disassembled; in the middle it is shown the assembly of the three control yokes, which is also shown at top disassembled.

In a fourth embodiment, FIGS. 18 and 23, the CVJ is similar to that of the second embodiment with the difference that the first shaft yokes 7, 7', 7" and the second shaft yokes 8, 8', 8" are forks supported at one side only (and not crosses supported at both sides, as it is the case in the second embodiment). The pivot axis A1 is oblique to the rotation axis X1. The angle f1 between the rotation axis X1 and the pivot axis A1 equals with the angle f2 between the rotation axis X2 and the pivot axis A2. The three control yokes 6, 6' and 6", which are actually control crosses, are pivotally mounted to each other to pivot about a common axis Z. All parts contribute to both, the control of the mechanism and the transfer of the torque loads and of the axial loads.

More specifically, the constant velocity joint of the fourth embodiment comprises:

a first shaft 2 rotating about a first rotation axis X1;

a second shaft 3 rotating about a second rotation axis X2, the first rotation axis X1 and the second rotation axis X2 intersect at a center 4 of the joint which is a point fixed relative to the first shaft 2 and relative to the second shaft 3;

a first triad of yokes 5 comprising a control yoke 6, a first shaft yoke 7 and a second shaft yoke 8, the first shaft yoke 7 being pivotally mounted on the first shaft 2 with the respective first pivot axis A1 passing from the center 4 of the joint and being oblique to the first rotation axis X1, the second shaft yoke 8 being pivotally mounted on the second shaft 3 with the respective second pivot axis A2 passing from the center 4 of the joint and being oblique to the second rotation axis X2, the angle f1 between the first pivot axis A1 and the first rotation axis X1 equals the angle f2 between the second pivot axis A2 and the second rotation axis X2, the three yokes 6, 7, 8 of the first triad of yokes 5 being pivotally mounted to each other to pivot about a first common axis C passing from the center 4 of the joint;

a second triad of yokes 5' comprising a control yoke 6', a first shaft yoke 7' and a second shaft yoke 8', the first shaft yoke 7' being pivotally mounted on the first shaft 2 with the respective first pivot axis A1' passing from the center 4 of the joint, the second shaft yoke 8' being pivotally mounted on the second shaft 3 with the respective second pivot axis A2' passing from the center 4 of the joint, the angle between the first pivot axis A1' and the first rotation axis X1 equals the angle between the second pivot axis A2' and the second rotation axis X2, the three yokes 6', 7', 8' of the second triad of yokes 5' being pivotally mounted to each other to pivot about a second common axis C' passing from the center 4 of the joint;

a third triad of yokes 5" comprising a control yoke 6", a first shaft yoke 7" and a second shaft yoke 8", the first shaft yoke 7" being pivotally mounted on the first shaft 2 with the respective first pivot axis A1" passing from the center 4 of the joint, the second shaft yoke 8" being pivotally mounted on the second shaft 3 with the respective second pivot axis A2" passing from the center 4 of the joint, the angle between the first pivot axis A1" and the first rotation axis X1 equals the angle between the second pivot axis A2" and the second rotation axis X2, the three yokes 6", 7", 8" of the third triad of yokes 5" being pivotally mounted to each other to pivot about a third common axis C" passing from the center 4 of the joint;

the control yoke 6 of the first triad of yokes 5, the control yoke 6' of the second triad of yokes 5' and the control yoke 6" of the third triad of yokes 5" are pivotally mounted to each other to pivot about a common axis Z perpendicular to the first common axis C, to the second common axis C' and to the third common axis C" at the center 4 of the joint.

Although the invention has been described and illustrated in detail, the spirit and scope of the present invention are to be limited only by the terms of the appended claims.

The invention claimed is:

1. A constant velocity joint comprising at least:

a first shaft (2) rotating about a first rotation axis (X1);

a second shaft (3) rotating about a second rotation axis (X2), the first rotation axis (X1) and the second rotation axis (X2) intersect at a center (4) of the joint which is a point fixed relative to the first shaft (2) and relative to the second shaft (3);

a first triad of yokes (5) comprising a control yoke (6), a first shaft yoke (7) and a second shaft yoke (8), the first shaft yoke (7) being pivotally mounted on the first shaft (2) with the respective first pivot axis (A1) passing from the center (4) of the joint and being oblique to the first rotation axis (X1), the second shaft yoke (8) being pivotally mounted on the second shaft (3) with the respective second pivot axis (A2) passing from the center (4) of the joint and being oblique to the second rotation axis (X2), the angle (f1) between the first pivot axis (A1) and the first rotation axis (X1) equals the angle (f2) between the second pivot axis (A2) and the second rotation axis (X2), the three yokes of the first triad of yokes (5) being pivotally mounted to each other to pivot about a first common axis (C) passing from the center (4) of the joint;

a second triad of yokes (5') comprising a control yoke (6'), a first shaft yoke (7') and a second shaft yoke (8'), the first shaft yoke (7') being pivotally mounted, on the first shaft (2) with the respective first pivot axis (A1') passing from the center (4) of the joint, the second shaft yoke (8') being pivotally mounted on the second shaft (3) with the respective second pivot axis (AZ) passing from the center (4) of the joint, the angle between the first pivot axis (A1') and the first rotation axis (X1) equals the angle between the second pivot axis (A2') and the second rotation axis (X2), the three yokes of the second triad of yokes (5') being pivotally mounted to each other to pivot about a second common axis (C') passing from the center (4) of the joint;

a third triad of yokes (5") comprising a control yoke (6"), a first shaft yoke (7") and a second shaft yoke (8"), the first shaft yoke (7") being pivotally mounted on the first shaft (2) with the respective first pivot axis (A1") passing from the center (4) of the joint, the second shaft yoke (8") being pivotally mounted on the second shaft (3) with the respective second pivot axis (A2") passing from the center (4) of the joint, the angle between the first pivot axis (A1") and the first rotation axis (X1) equals the angle between the second pivot axis (A2") and the second rotation axis (X2), the three yokes of the third triad of yokes (5") being pivotally mounted to each other to pivot about a third common axis (C") passing from the center (4) of the joint, the control yoke (6) of the first triad of yokes (5), the control yoke (6') of the second triad of yokes (5') and the control yoke (6") of the third triad of yokes (5") are pivotally mounted to each other to pivot about a common axis (Z) perpendicular to the first common axis (C), to the second common axis (C') and to the third common axis (C") at the center (4) of the joint.

2. A constant velocity joint according claim 1 wherein:
the first pivot axis (A1') of the first shaft yoke (7') of the second triad of yokes (5') being oblique to the first rotation axis (X1).

3. A constant velocity joint according claim 1 wherein:
the first pivot axis (A1) and the second pivot axis (A2) being substantially perpendicular to the first common axis (C).

4. A constant velocity joint according claim 1 wherein:
the first shaft yoke (7) being supported on the first shaft (2) by a pair of bearings, the pair of bearings being arranged at opposite sides of the center (4) of the joint.

5. A constant velocity joint according claim 1 wherein:
the first shaft yoke (7) is supported on the first shaft (2) only at one side relative to the center (4) of the joint.

6. A constant velocity joint according claim 1 wherein:
the control yokes (6, 6', 6") of the three triads of yokes (5, 5', 5") are crosses, the rest yokes (7, 7', 7", 8, 8', 8") of the three triads of yokes (5, 5', 5") are forks.

7. A constant velocity joint according claim 1 wherein:
the first shaft yokes (7, 7', 7") and the second shaft yokes (8, 8', 8") are crosses.

\* \* \* \* \*